Aug. 3, 1954     F. K. H. NALLINGER     2,685,212
STEERING MECHANISM FOR MOTOR VEHICLES
Filed Nov. 14, 1950
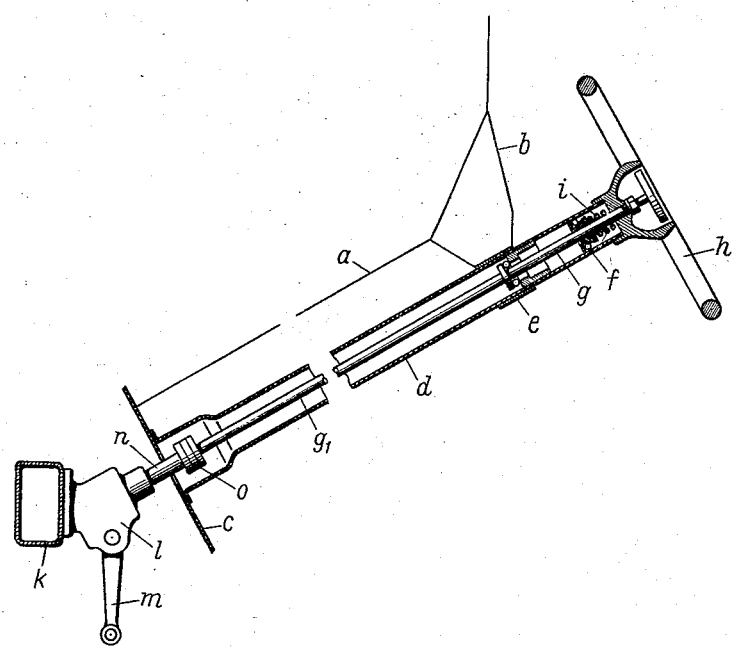
INVENTOR
FRIEDRICH K.H. NALLINGER
By:
Houltine Lake + Co.
AGENTS Patented Aug. 3, 1954

2,685,212

UNITED STATES PATENT OFFICE 2,685,212

STEERING MECHANISM FOR MOTOR VEHICLES

Friedrich K. H. Nallinger, Stuttgart-N, Germany, assignor to Daimler-Benz Aktiengesellschaft, Stuttgart-Unterturkheim, Germany Application November 14, 1950, Serial No. 195,552

1 Claim. (Cl. 74—492)

The present invention relates to a steering mechanism for motor vehicles, in which the lower part of the steering column, for example the leading or steering gear on the one hand, and the upper part of the steering column, for example the steering wheel on the other hand are arranged on vehicle parts, which are movable relatively to one another, for example on the one hand on the chassis and on the other hand on the car body.

It is one object of the invention to absorb in the simplest manner the relative movements between the two parts of the vehicle by appropriate development of the steering column.

A further object of the invention is above all such an arrangement and development of the steering column that the steering wheel is located tightly in the hand of the driver independently from the movements of the leading gear or of the lower end of the steering column, i. e. as a rule independently from the movements between chassis and car body, without necessitating complicated and expensive transmission rods or couplings for this purpose.

A further object of the invention is moreover concerned with simple additional means, which have for their purpose to prevent simultaneously a conduction of noises and vibrations of higher frequency from the leading gear to the steering column or to the steering wheel.

In accordance with these objects, one feature of the invention is that one end, particularly the upper end of the steering column having the steering wheel mounted thereon is arranged on the car body, or on a part which is rigidly connected to it, essentially unyielding to lateral movements, and for compensation of the lateral movements of the leading gear, or of the lower end of the steering column, the latter is developed with flexural elasticity. In a given case it can simultaneously also be developed with torsional elasticity. In accordance with further features of the invention the steering wheel or the upper end of the steering column is supported in two bearings, which are arranged immovably on the car body, for example in a tubular steering post, which is immovably connected with the car body, and are for example developed as two opposite axially supporting thrust bearings.

In the drawing an example of construction of the invention is shown diagrammatically, comprising the car body $a$ with the instrument panel $b$ and the fire wall $c$, which closes the floor space towards the front. The steering post $d$ is immovably screwed on the fire wall $c$ and the instrument panel $b$. Within the post the steering column $g$ is located by means of the ball thrust bearings $e$ and $f$, which support it axially in opposite directions. The steering wheel $h$ is placed on the upper end of the steering column. A spring $i$ places the ball thrust bearings $e$ and $f$ under an axial spring pressure.

Independently from the car body the leading gear $l$ is fastened to the vehicle chassis for example to an auxiliary frame, which supports the front suspension, and of which a cross girder $k$ is shown, i. e particularly in such a manner that it cannot make any relative movements, which hamper the steering kinematics, with reference to the wheels, which are steered by it by means of the steering knuckle $m$.

Furthermore, in order to compensate the relative movements between the leading gear $l$, on the one hand, and the steering wheel $h$ on the upper end of the steering column $g$, on the other hand, without having to provide complicated yielding means, the steering column, instead of being rigid as in known constructions, is provided with a certain amount of flexural and for example also torsional elasticity. The steering column is divided into a short upper portion $g$ and a longer lower portion $g_1$, and it is supported on the car body only at its upper end adjacent the steering wheel and connected to the leading gear at its lower end. It is so supported that its short portion cannot move transversely of the longitudinal axis of the column, while the longer portion is free to move in all directions to absorb relative movements which are thus compensated through flexure or torsion of the column. At its lower end the steering column may be connected to the leading gear through a coupling $o$ of sound-absorbing material to prevent the transmission of sonic frequencies from the wheels to the steering wheel. The invention is not restricted to the example of construction illustrated, but it can be varied at discretion within the scope of the appended claim.

What I claim is:

In a motor vehicle having a body part and a chassis, the body part being capable of limited relative movement in a transverse plane, a rotatable steering column having a steering wheel mounted at its upper end, a tubular steering post freely surrounding the steering column and constructed and arranged to restrain the upper end thereof against movements directed transversely of the vehicle, the steering column being resiliently flexible and connected at its lower end to a steering mechanism firmly mounted on the chassis, bearing means for the steering column inside the steering post adjacent to the steering wheel comprising two opposed, axially spaced thrust bearings arranged inside the tubular steering post, and spring means resiliently urging the thrust bearings into engagement with the steering post, the steering post freely surrounding the steering column with sufficient clearance to permit resilient transverse flexing thereof.

References Cited in the file of this patent

UNITED STATES PATENTS

| Number | Name | Date |
|---|---|---|
| 656,962 | Gibson | Aug. 28, 1900 |
| 869,994 | Thompson et al. | Nov. 5, 1907 |
| 941,129 | Charter | Nov. 23, 1909 |
| 1,572,519 | Davis | Feb. 9, 1926 |
| 1,689,924 | Maloney | Oct. 30, 1928 |
| 1,938,740 | Dalton | Dec. 12, 1933 |
| 2,088,146 | Walker | July 27, 1937 |
| 2,226,656 | Best | Dec. 31, 1940 |
| 2,227,821 | Burrell | Jan. 7, 1941 |
| 2,464,856 | Finley | Mar. 22, 1949 |
| 2,549,925 | Paton | Apr. 24, 1951 |

FOREIGN PATENTS

| Number | Country | Date |
|---|---|---|
| 577,769 | France | June 12, 1924 |